UNITED STATES PATENT OFFICE.

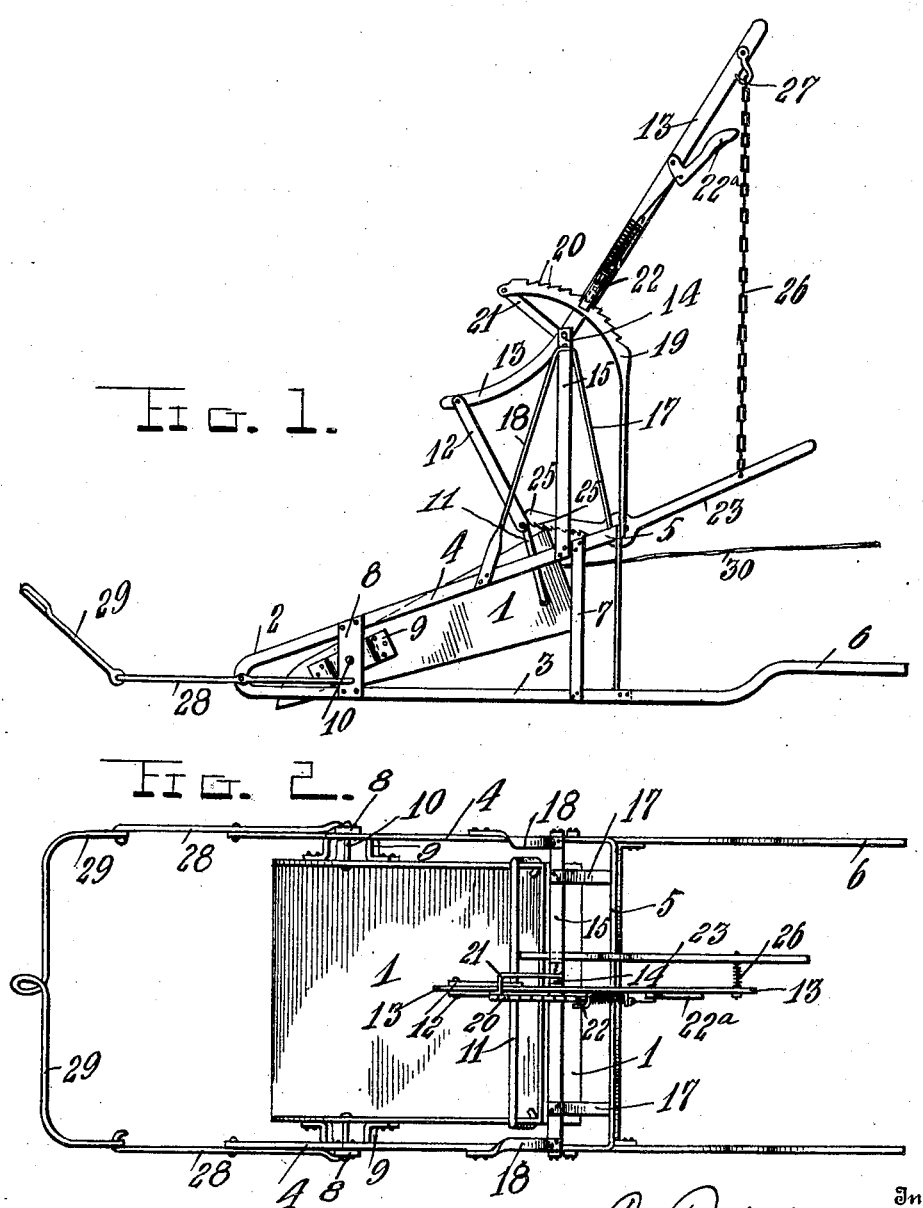

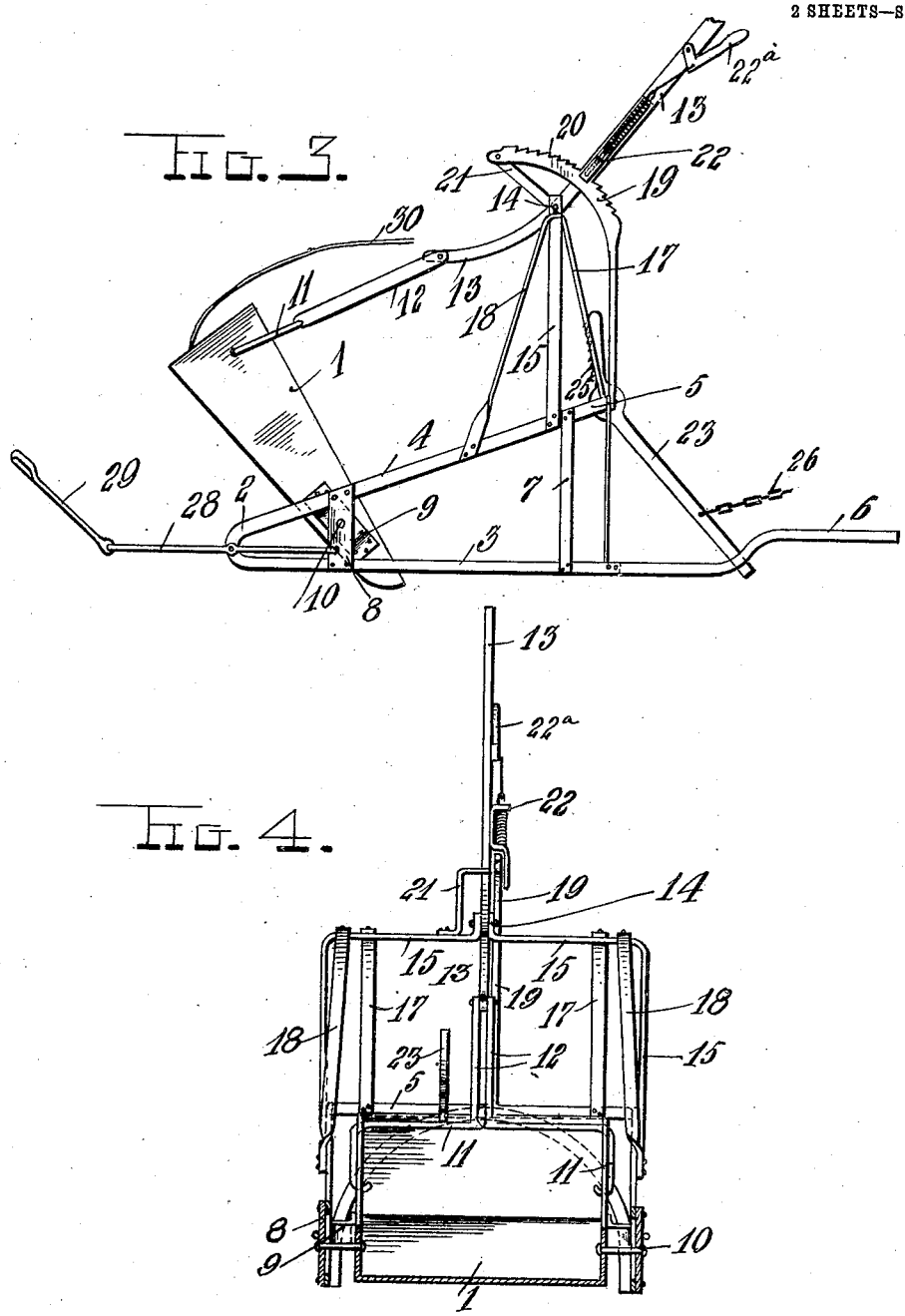

COMODORE P. WELLS, OF McKNIGHT, OKLAHOMA, ASSIGNOR OF ONE-HALF TO ROBERT L. WILLIAMS, OF HOLLIS, OKLAHOMA.

SCRAPER.

934,777.      Specification of Letters Patent.      Patented Sept. 21, 1909.

Application filed April 7, 1909. Serial No. 488,420.

*To all whom it may concern:*

Be it known that I, COMODORE P. WELLS, a citizen of the United States, residing at McKnight, in the county of Greer and State of Oklahoma, have invented certain new and useful Improvements in Scrapers, of which the following is a specification, reference being had to the accompanying drawings.

This invention relates to improvements in scrapers of that class having dumping scoops or shovels.

The object of the invention is to provide a simple and practical device of this character which will be strong and durable and which has improved means for holding the scoop in its normal position and means for dumping the same.

With the above and other objects in view, the invention consists of the novel features of construction and the combination and arrangement of parts hereinafter fully described and claimed, and illustrated in the accompanying drawings, in which—

Figure 1 is a side elevation of the improved scraper; Fig. 2 is a top plan view; Fig. 3 is a side elevation showing the parts in their dumped position; and Fig. 4 is a transverse sectional view.

In the drawings 1 denotes a scoop or shovel pivotally mounted in a frame 2 having runners 3. Said runners and the main portion of the frame are preferably formed from a single metal bar having its intermediate portion bent to form the rectangular upper portion of the frame 2 and to provide the side bars 4 and a connecting rear cross bar 5, the ends of said bar being bent rearwardly beneath the side bars 4 to provide the runners 3 and the extremities of said runners being bent upwardly or offset, as shown at 6, to provide foot pieces on which the operator may stand and ride. The rectangular upper portion of the frame consisting of the parts 4, 5 is inclined downwardly and forwardly and said parts are connected to the runners 3 by uprights 7, 8.

The scoop 1 is pivotally mounted by providing upon the forward portions of its side flanges, bracket plates 9 in which are mounted pivots 10 projecting from or through the forward uprights 8.

Connected to the rear portions of the sides of the scoop 1 is a swinging bail 11, the center of which latter is connected by links 12 to the curved forward end of a lifting and dumping lever 13. The latter is fulcrumed intermediate its ends, as shown at 14, in an upright rectangular or U-shaped arch 15, the upright or side portions of which latter rise from the bars 4 and are braced by front and rear inclined braces 17, 18. The pivot 14 for the hand lever 13 is carried by the central portion of the top or cross bar of the arch 15, which top or cross bar has connected to it a centrally arranged, vertically extending, and longitudinally curved brace 19 provided with a segmental rack 20 and a guide loop 21 for the lever 13. Said rack 20 is adapted to be engaged by a slidably mounted, spring pressed pawl 22 arranged upon the lever and connected by a link to a retracting hand piece or bell crank 22ª pivoted on the upper or handle end of said lever 13.

The scoop is adapted to be held in its lowered position to prevent it from tilting by means of a ratchet lever 23, which latter is pivoted intermediate its ends on the cross bar 5 and has its short forward end provided with a plurality of ratchet teeth 25 adapted to engage the upper edge of the rear wall of the scoop. The long rear portion of the lever 23 is of greater weight than the ratchet end 25 of the same so that when the lever is released, said ratchet end will disengage the scoop. A chain or other flexible connection 26 has its lower end attached to the rear end of the lever 23 and is provided for the purpose of holding its ratchet end 25 in engagement with the scoop. The other end of said chain 26 is adjustably and detachably connected to the hand lever 13, as shown at 27, or in any other suitable manner.

Projecting forwardly from the side portions of the frame 2 are arms 28 to which are pivoted a bail 29 provided for the attachment of draft animals or a draft cable.

30 denotes a cable attached to the rear portion of the scoop for the purpose of drawing it rearwardly.

In operation, assuming the parts to be in their normal position shown in Fig. 1, when it is desired to dump the scoop, the lever 13 is unlocked by retracting the pawl 22 from engagement with the rack 20 and the upper or rear end of said lever is swung downwardly. When this is done, the front end 13 of the lever moves upwardly and the links 12 lift the rear portion of the scoop after the latter has been released from the ratchet end 25 of the locking lever 23. Said links 12 lift the scoop and throw it over to the inverted position shown in Fig. 3 of the drawings and it may be returned to its righted or normal position by pulling upon the cable 30.

Having thus described my invention what is claimed is:

1. A scraper comprising a frame having runners, the rear ends of the latter being offset in an upward direction to provide foot pieces on which the operator may stand, a dumping scoop in said frame and means for operating said scoop.

2. A scraper comprising a frame formed from a metal bar by bending its intermediate portion into U-form to provide an upper, downwardly and forwardly inclined part and bending its ends rearwardly to provide runners, a dumping scoop arranged in said frame, and means for operating said scoop.

3. A scraper comprising a frame having runners, a dumping scoop pivotally mounted adjacent its front ends in said frame, a scoop lifting lever operatively connected to the rear portion of the scoop and means for locking said lever.

4. A scraper comprising a frame having runners, a dumping scoop pivotally mounted adjacent its front ends in said frame, a scoop lifting means operatively connected to the rear portion of the scoop and means for locking the scoop in its lowered normal position.

5. A scraper comprising a frame having runners, a dumping scoop pivotally mounted adjacent its front ends in said frame, a scoop lifting means operatively connected to the rear portion of the scoop and a ratchet lever pivoted on the frame and engaged with the rear portion of the scoop to lock the same in its lowered position.

6. A scraper comprising a frame having runners, a dumping scoop pivotally mounted adjacent its front ends in said frame, a scoop lifting lever operatively connected to the rear portion of the scoop, means for locking said lever in adjusted position, a ratchet lever to engage the rear portion of the scoop, and means for securing said ratchet lever against movement.

7. A scraper comprising a frame having runners, a dumping scoop pivotally mounted adjacent its front ends in said frame, a scoop lifting lever operatively connected to the rear portion of the scoop, means for locking said lever in adjusted position, a ratchet lever to engage the rear portion of the scoop, and a connection between said ratchet lever and the first mentioned lever.

In testimony whereof I hereunto affix my signature in the presence of two witnesses.

COMODORE P. WELLS.

Witnesses:
M. W. PROCK,
CLAUD PRATHER.